April 23, 1929. D. W. KENT-JONES ET AL 1,710,503
TREATMENT OF CEREAL SUBSTANCES
Filed Sept. 3, 1924 3 Sheets-Sheet 3
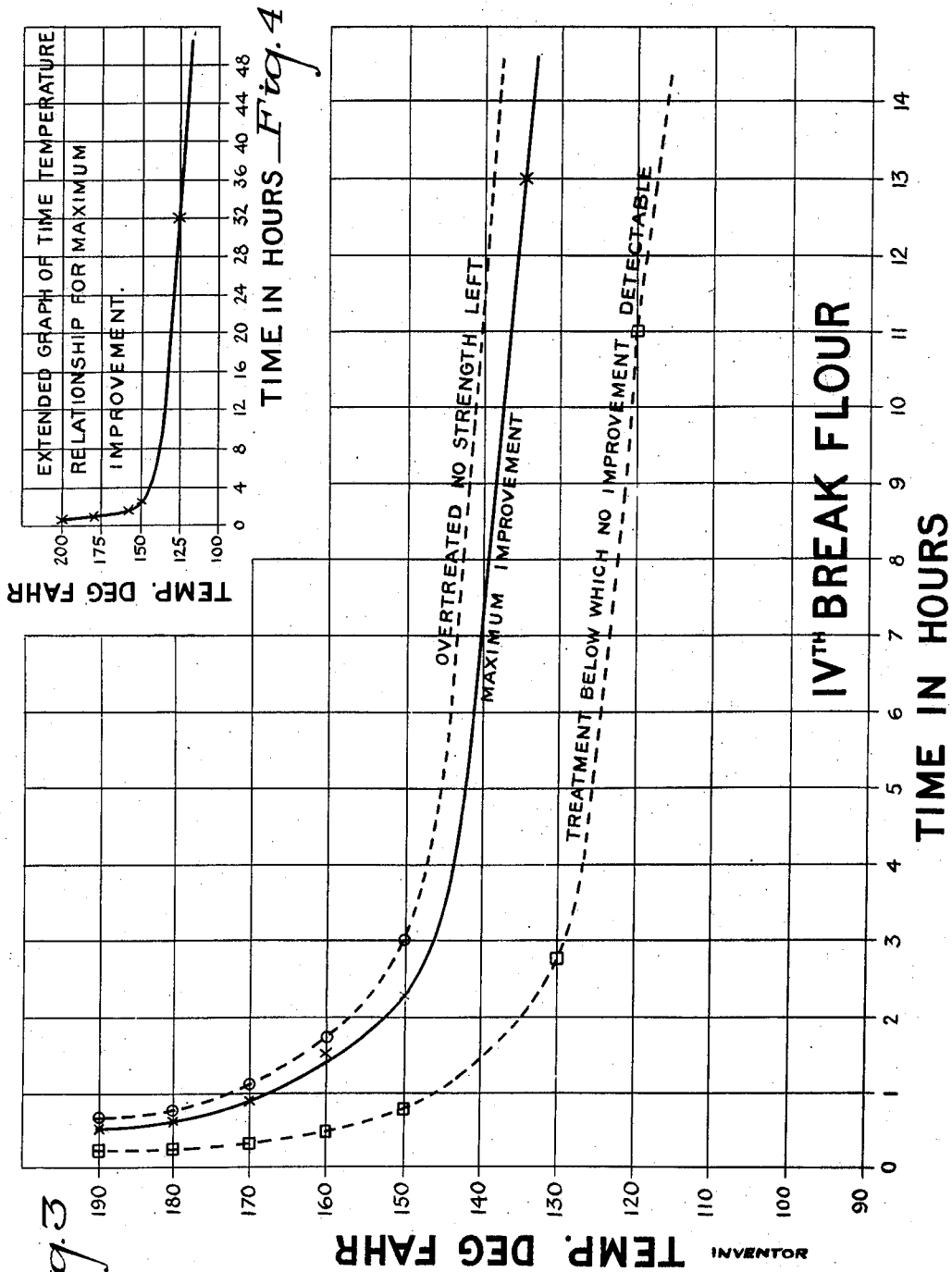

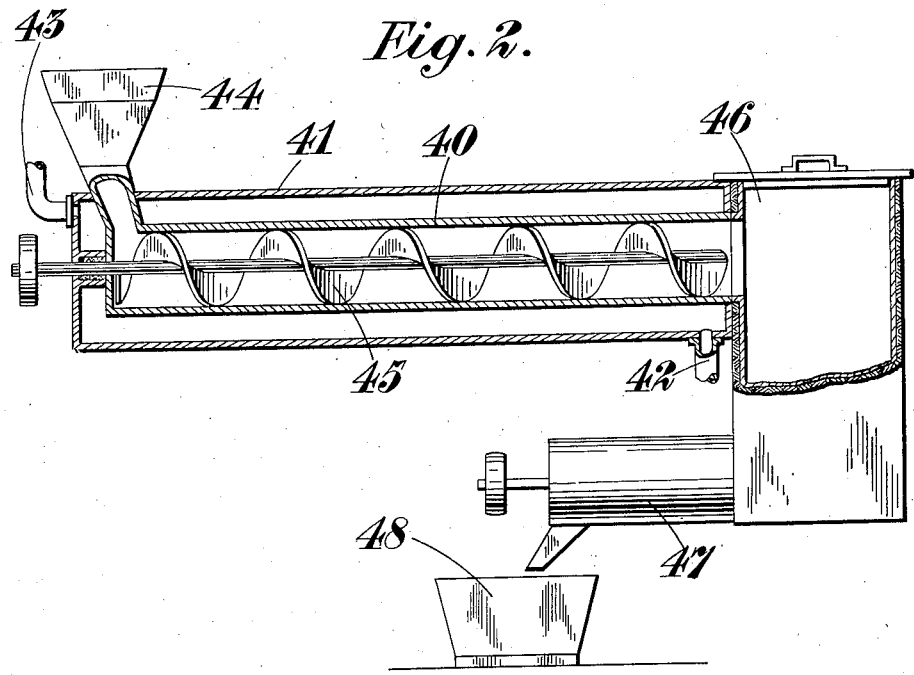

Patented Apr. 23, 1929.

1,710,503

UNITED STATES PATENT OFFICE.

DOUGLAS WILLIAM KENT-JONES AND CHARLES WOODLAND CHITTY, OF DOVER, ENGLAND, ASSIGNORS TO WOODLANDS LIMITED, OF DOVER, ENGLAND, A BRITISH COMPANY.

TREATMENT OF CEREAL SUBSTANCES.

Application filed September 3, 1924, Serial No. 735,628, and in Great Britain September 12, 1923.

This invention comprises improvements in or relating to the treatment of cereal substances so as to improve their baking qualities.

It is known that by heating wheat grains containing or having added to them a sufficient quantity of moisture, at a temperature of something over 100° F. but not over 120° F., the wheat is brought into a suitable condition for milling and also that this treatment may result in a slight increase in "strength" in the resulting flour, that is to say, the flour tends to give a bolder better risen loaf when it is made into dough and baked. The improvement in strength obtained in this way, however, is not substantial and it is often desirable that flour should receive a considerable increase in strength, which is sometimes imparted to it by the addition of chemical "improvers" or by chemical treatment of the flour. It is an object of the present invention to impart strength to the flour to a degree comparable to and even beyond that obtained by "improvers" or chemical treatment, without the necessity of applying any chemicals to the cereals treated.

We have discovered that when wheat or flour is treated at an elevated temperature in the region of 120° to 230° F., the treatment may be continued for a certain time (which is quite long in the case of the lower temperatures and quite short in the case of the higher ones) without any noticeable improvement in the "strength" of flour milled therefrom taking place. For example, in the case of wheat at a temperature of 130° F. a very slight increase (only just perceptible) is noticed in the resulting flour, when the wheat has received six hours treatment. If the treatment is longer than this, however, a considerable change takes place which results in the flour produced having a considerably greater "strength". The maximum effect takes place within 24 hours at the temperature stated. Again at 145° F. after one hour's treatment there is usually no perceptible increase in strength of the resulting flour, but with treatment of the wheat for six hours a considerable improvement in "strength" is obtained.

According to the present invention a process for the treatment of wheaten cereal substances consists in dry heating the substance to a temperature approximately between the limits of 120 and 230 degrees Fahrenheit for a period of time longer than the initial period hereinabove described during which no substantial increase in strength of the resulting flour is obtained.

According to a further feature of the invention a process for the treatment of wheat in berry-form consists in dry heating the wheat to a temperature approximately between the limits of 120° and 230° F. for a period of time (say for 6 to 8 hours at 140° F. or for two hours at 170° F.) longer than the initial period hereinabove described during which no substantial increase in strength of the resulting flour is obtained.

The invention is applicable to the treatment of flour as well as wheat and a specific form of the invention specially applicable to the treatment of flour is described in co-pending application, Serial No. 66,993, filed Nov. 5th 1925, a division hereof. By the term "dry-heating" as used herein we intend to exclude treatment by steam, which tends to break up the starch granules of the cereal. The presence of a certain small quantity of moisture is not detrimental, and indeed cannot be avoided.

If the treatment is continued beyond a certain time it is found that the gluten contained in the resulting dough becomes non-retainable in a washing test—that is to say—if the flour is made into a dough with water and after say one hour in water is then washed in running water substantially all the gluten washes away with the starch and none is retained in the hand. Flour so heated cannot be satisfactorily made into bread unless it is blended with untreated flour but it is found that if it is so blended good results are obtained.

Preferably, however, the period of time of the treatment is so limited as to be less than that which at the temperature employed, will render the gluten contained in the resulting dough non-retainable in a washing test as hereinabove described. Conveniently the temperature in this case should not exceed 230° F.

In the accompanying drawing—

Figure 2 shows digrammatically an apparatus for the treatment of flour so as to afford a continuous process.

Fig. 3 is a graph showing the relation between temperature and time of treatment in our process.

Figure 4 is a graph similar to that of Fig. 3, but extended to wider range.

Figure 1:
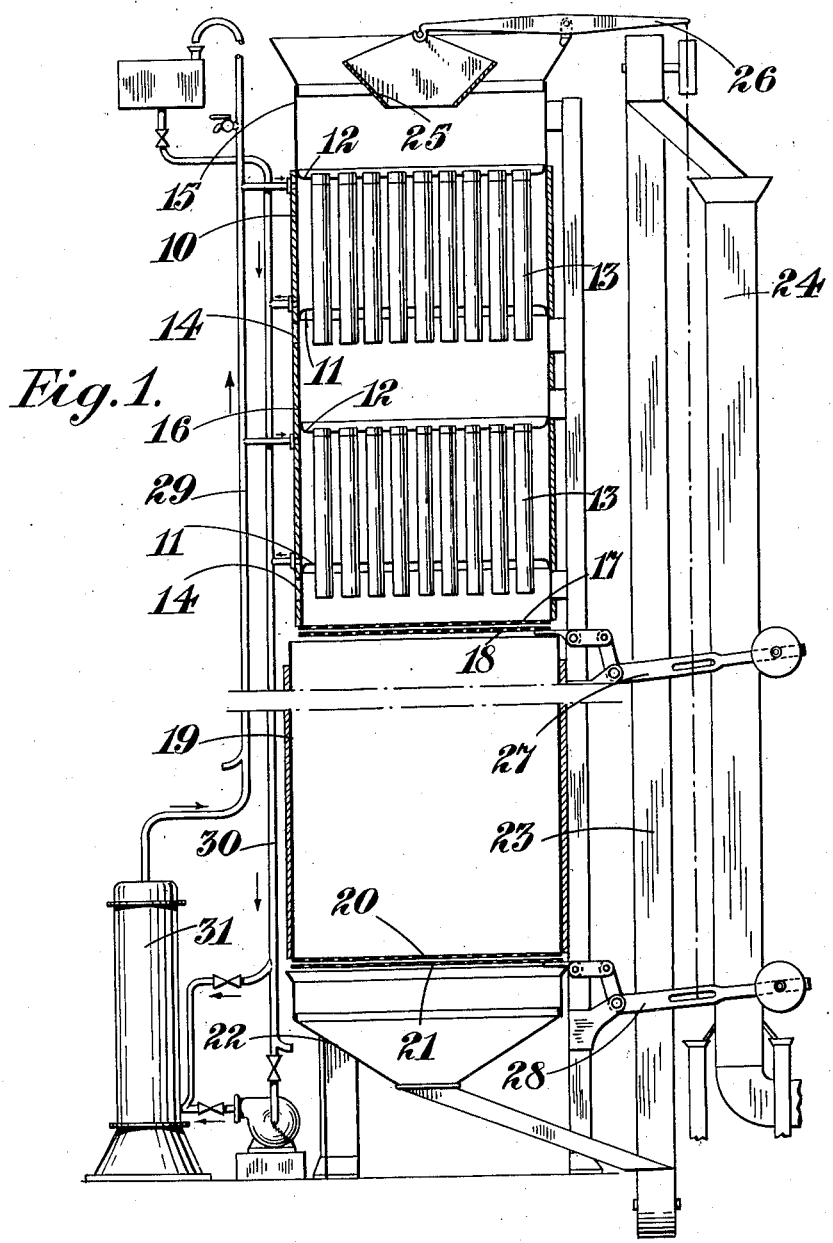
Figure 1 shows diagrammatically one form of apparatus which may be employed for the treatment of wheat in berry-form.

The curve shown in Figure 3 illustrates by a continuous heavy line the relation between temperature and time of treatment required to obtain the optimum improvements in a particular sample of English wheat. The upper dotted curve represents the time temperature relation of the limit of heat treatment beyond which the gluten all becomes washed away with the starch in a washing test. The lower dotted curve represents the time temperature relation of the minimum treatment which suffices to show any improvement in the "strength" of the flour. Treatment of this flour for any period less than that indicated by the lower curve would not show any alteration in the stiffness of the dough or its ability to stand up in a well formed loaf, although other effects might be observed at shorter periods of treatment, particularly increase of enzymatic activity or "gas-making power". A different kind of flour, or flour grown in a different season, would show a similar curve, but the line of advantageous treatment would lie at a slightly different position in the graph.

The heating may be carried out at various pressures but is preferably carried out at not less than atmospheric pressure. The substance is best heated under conditions which exclude the passage of air currents through or over the body of wheat under treatment.

At the same time it is desirable in the case of wheat that the wheat should be heated under conditions which permit free escape of evaporated moisture from the wheat. If conditions retarding escape of vapours are employed in treating wheat, unless the wheat is dry the effect is to produce what may be described as a "stewing" action, that is a condition in which the hot wheat is bathed in hot moist air. The result is that although the increase in strength is obtained the resulting flour may be changed somewhat in flavour. This is particularly the case if moisture has been added to the wheat in the manner usual in conditioning processes. It is preferred, therefore, to treat the wheat in its natural condition without any preliminary addition of moisture thereto. By using dry wheat and/or permitting evaporation and escape of moisture from the wheat "stewing" is avoided and the substantial increase in strength of the resulting flour is obtained without altering its flavour.

The wheat may be and preferably is conditioned for grinding by damping and/or washing after the heat treatment. This conditioning or tempering may be done in one of the well known ways.

The percentage of moisture evaporated during the heat treatment of the wheat will vary with different wheats and conditions of treatment. Thus, in one case a wheat containing 13% of moisture after heating at a temperature of 130° F. for 24 hours had the moisture content reduced to between 6 and 7% and during this time the flour had acquired the required extra "strength". In other cases the heat treatment only caused a reduction of moisture from 14½% to just under 12%. Again, another wheat lost moisture during treatment until, instead of 14½%, it contained only 8½%. An Australian wheat of 10½% moisture had its moisture reduced by ¼% only, but the improvement was excellent. It is not the evaporation which causes the increase in strength. The evaporation is only incidental.

Various examples of the carrying into effect of the invention will now be described.

The apparatus shown in Figure 1 comprises an upper cylindircal steel chamber 10 which is made in two sections. Each section has two diaphragms 11, 12 into which is fitted a nest of tubes 13. The tubes 13 are open at both ends. The top ends are nearly flush with the upper plate 12 but at their lower ends they project several inches below the lower plate 11. Opposite to the downwardly projecting portions of the tubes 13 are exhaust holes 14 in the wall of the casing. The casing is lagged with asbestos to retain the heat.

Above the upper nest of tubes the casing 10 is extended to constitute a hopper 15 and a space 16 is provided between the upper and lower nests of tubes. Below the lower nest of tubes is a plate 17 perforated with parallel slots. A second plate 18, slotted like the plate 17, is arranged to slide against the plate 17 so that when the slots in the two plates are in line with one another there is a free passage for the wheat, while by sliding the plate 18 a little to one side this passage becomes closed.

Below the plate 18 is a second casing 19 which constitutes a treatment chamber and is provided at the bottom with controlling plates 20, 21 similar to the plates 17, 18. Below the plate 21 is a hopper 22 from which the wheat is delivered by the elevator 23 to a cooling leg 24. The cooling leg 24 is of usual construction. The cooling is performed by blowing a column of cold air through the column of descending grain.

Within the hopper 15 is a regulating bucket 25 which is open at the bottom and is carried on a balance arm 26 which is arranged to be connected in any suitable manner to either of the operating levers 27, 28.

of the plates 18, 21, respectively, as may be required for carrying out the operations hereinafter described.

Provision is made for circulating hot water around the tubes 13 in the space between the plates 11, 12 and to this end hot water is supplied through a pipe 29 and withdrawn through a pipe 30 of a hot water circulating system which is heated by a calorifier 31. The details of this hot water system may be any desired. Preferably there is provided thermostatic temperature regulation for the hot water and means for putting the hot water under pressure in the event of temperatures greater than 212° F. being required for the water.

In operation, wheat is fed continuously into the bucket 25 from which it flows into the hopper 15 and down through the tubes 13 till it reaches the regulating plate 17 which initially is shut. The tubes 13 and the spaces below them become completely filled with wheat and the hopper 15 also fills until the wheat in it rises to the bottom of the bucket 25 in the form of a conical mound and closes the bottom of the bucket. Thereupon the bucket 25 will commence to fill. During this initial stage the lever 26 is operatively connected to the lever 27 of the plate 18. While the wheat is in the casing 10 of the apparatus it is being heated up. Feeding of wheat into the bucket 25 is continued until presently the weight of wheat in this bucket becomes sufficient to overcome the support afforded by the mound of wheat in the hopper 15. The bucket 25 then falls suddenly, spreading the wheat in 15 to each side and simultaneously opening the discharge for the wheat through the plates 17, 18 by means of the levers 26, 27.

Heated wheat from the casing 10 will now commence to pass into the lower treatment chamber 19 where it accumulates upon the plate 20 the openings of which are shut by the plate 21. As the wheat passes through the plate 17 the level in the hopper 15 falls, the bucket 26 empties itself and presently becomes light enough to rise under the influence of the counterweighted lever 27 so that the openings in the plate 18 are again shut. The cycle of operations then recommences and is continued until the chamber 19 is full of heated wheat. The lever 26 is thereupon connected with the lever 28 and the plate 17 is set so as to be permanently open. Operations then continue the periodic discharge taking place through the plate 20 making room for the introduction of fresh wheat at 15. The rate of feed to the bucket 25 is regulated so that the total time taken for the wheat to pass through the apparatus will be sufficient to give it the required heat treatment. It will be understood that the wheat loses very little heat in the chamber 19. As soon as the wheat issues from the plate 20 it passes at once to the cooling leg 24 where its temperature is reduced and further heat treatment prevented.

It is found that various wheats require different degrees of heat treatment. The best conditions for each wheat are readily determinable by practical trial and various examples are given below. The amount of improvement obtainable also varies with the character of the wheat. English wheat, "Manitoba", "Plates", Australian wheat and Russian wheat all show good improvements. Indian and Persian wheats are, in general, not found to be improved by the heat treatment. The period of the heat treatment according to this invention depends to some extent on the heat conductivity of the wheat under treatment. A wheat which is naturally or artificially moist is a better conductor than a dry wheat and at any particular temperature may require a shorter period of treatment.

It has been found in testing flours milled from "Manitoba", "Plates" and Australian wheat, that an improvement in the amount of water absorbed by the flour when made into dough for a baking test was obtained from 60 quarts per sack (untreated) to 64 quarts per sack (treated), the initial moisture in the flour being the same in both cases. The improvement obtained by the use of a chemical improver was less. At the same time the dough of the flour made from the heat-treated wheat was more resilient and yielded bolder better-risen loaves. The above results were obtained by subjecting the wheat to treatment in the apparatus shown in the drawings, raising the temperature of the wheat to 180° F. in the casing 15. The wheat was discharged at 170° F. from the second chamber 19 after being two hours in the apparatus altogether.

The following table gives the times required to effect the maximum improvement on a particular sample of English wheat at various temperatures, and also illustrates the varieties of time with temperature:—

110° F _____ 5 days (120 hours),
120° F _____ 3–4 days (72–96 hours),
145° F _____ 6–8 hours,
155° F _____ 2 hours.

Flour made from wheat heated for 6 hours at 165° F. was found to be useless as such for baking into bread, but on blending with untreated flour in a proportion of one part overtreated to six parts untreated flour the blend was found to be superior in strength to untreated flour used alone. Other English wheat required substantially less treatment.

Similar variations of time required for the treatment at different temperatures occur with other wheats, the actual figures, however, varying with the particular brand.

The term flour is used in this specification as including those types of milling stock known as semolina, middlings and dunst and in fact as including all kinds of wheaten stock after the grain has been broken so that its interior becomes exposed.

The expression "wheaten cereal substance" means wheat in berry form or a gluten bearing wheat product such as flour.

We claim:

1. A process for the treatment of wheaten cereal substances consisting in dry heating the substance to a temperature approximately between the limits of 120 and 230 degrees Fahrenheit for a period of time which at the temperature employed will be less than that which will render gluten contained in dough made from the product non-retainable in a washing test as herein described but longer than the initial period herein described during which no substantial increase in "strength" of the resulting flour is obtained.

2. A process for the treatment of wheat consisting in dry heating the wheat in berry form to a temperature approximately between the limits of 120 and 230 degrees Fahrenheit for a period of time which at the temperature employed will be less than that which will render non-retainable in a washing test as herein described gluten contained in dough made from flour ground from the treated wheat but longer than the initial period herein described during which no substantial increase in "strength" of the resulting flour is obtained.

3. A process for the treatment of wheaten cereal substances consisting in dry heating the substance under non-oxidizing conditions to a temperature approximately between the limits of 120 and 230 degrees Fahrenheit for a period of time which at the temperature employed will be less than that which will render gluten contained in dough made from the product non-retainable in a washing test as herein described but longer than the initial period herein described during which no substantial increase in "strength" of the resulting flour is obtained.

4. A process for the treatment of wheat consisting in heating the wheat in berry-form under conditions which permit free escape of evaporated moisture from the wheat to a temperature approximately between the limits of 120 and 230 degrees Fahrenheit for a period of time which at the temperature employed will be less than that which will render non-retainable in a washing test as herein described gluten contained in dough made from flour ground from the treated wheat but long enough to yield an increase in "strength" of the resulting flour substantially as herein set forth.

5. A process for the treatment of wheat consisting in heating the wheat in berry-form under conditions which exclude the passage of air currents over the wheat but under conditions which permit free escape of evaporated moisture from the wheat to a temperature approximately between the limits of 120 and 230 degrees Fahrenheit for a period of time which at the temperature employed will be less than that which will render non-retainable in a washing test as herein described gluten in dough made from flour ground from the treated wheat, but long enough to yield an increase in "strength" of the resulting flour substantially as herein set forth.

6. A process for the treatment of wheaten cereal substances consisting in dry-heating the substance at not less than atmospheric pressure to a temperature approximately between the limits of 120 and 230 degrees Fahrenheit for a period of time which at the temperature employed will be less than that which will render gluten contained in dough made from the product non-retainable in a washing test as herein described but longer than the initial period herein described during which no change in the character of the gluten-forming constituents takes place such as to yield a substantial increase in "strength" of the resulting flour and thereafter cooling the substance at not less than atmospheric pressure.

7. A process for the treatment of wheaten cereal substances consisting in dry-heating the substance in berry form at not less than atmospheric pressure to a temperature approximately between the limits of 120 and 230 degrees Fahrenheit for a period of time which at the temperature employed will be less than that which will render gluten contained in dough made from the product non-retainable in a washing test as herein described but longer than the initial period herein described during which no change in the character of the gluten-forming constituents takes place such as to yield a substantial increase in "strength" of the resulting flour and thereafter cooling the substance at not less than atmospheric pressure.

8. A process for the treatment of a wheaten cereal substance for the purpose of increasing the "strength" thereof consisting in dry-heating the substance at not less than atmospheric pressure to a temperature approximately between the limits of 120° and 230° Fahrenheit for a time which at the temperature employed will be sufficient to substantially effect the herein-described optimum improvement in the strength of the resultant flour and thereafter cooling the substance at not less than atmospheric pressure.

9. A process for the treatment of a wheaten cereal substance for the purpose of increasing the "strength" thereof consisting in dry-heating the substance in berry form to a temperature approximately between the limits of 120° and 230° Fahrenheit for a time which at the temperature employed will be sufficient to substantially effect the herein-described improvement in the strength of the resultant flour and thereafter cooling the substance at not less than atmospheric pressure.

10. A wheaten cereal product containing only substances naturally present in the grain but wherein the gluten-forming constituents are in such a state due to heat treatment at a temperature between 120° and 230° F. to impart strength to dough made therefrom substantially as herein set forth.

11. A wheaten cereal product containing gluten-forming constituents in a state to impart maximum strength to a dough made therefrom, said product being a wheaten substance heat-treated at a temperature between 120° and 230° F. for sufficient time to cause a substantial increase in "strength" of the resulting flour, but insufficient to render gluten contained in dough made from the product non-retainable in a washing test as herein described.

12. A wheaten cereal product containing only substances naturally present in the grain but wherein the gluten-forming constituents are in an advanced state of partial coagulation due to heat treatment at a temperature between 120 and 230° F., such coagulation being insufficient to render the gluten non-retainable in a washing test, and wherein the starch particles are substantially in their natural condition, substantially as herein set forth.

13. Wheat in berry form containing only substances naturally present in the grain but wherein the gluten-forming constituents are in an advanced state of partial coagulation due to heat treatment at a temperature between 120 and 230° F., such coagulation being insufficient to render the gluten non-retainable in a washing test, and wherein the starch particles are substantially in their natural condition, substantially as herein set forth.

In testimony whereof we have signed our names to this specification.

DOUGLAS WILLIAM KENT-JONES.
CHARLES WOODLAND CHITTY.